United States Patent
Nguyen et al.

(10) Patent No.: US 11,157,473 B2
(45) Date of Patent: Oct. 26, 2021

(54) MULTISOURCE SEMANTIC PARTITIONING (71) Applicant: Red Hat, Inc., Raleigh, NC (US)

(72) Inventors: Filip Nguyen, Brno (CZ); Filip Elias, Vysni Lhoty (CZ)

(73) Assignee: RED HAT, INC., Raleigh, NC (US)

( * ) Notice: Subject to any disclaimer, the term of this patent is extended or adjusted under 35 U.S.C. 154(b) by 700 days.

(21) Appl. No.: 14/550,166

(22) Filed: Nov. 21, 2014

(65) Prior Publication Data
US 2016/0147837 A1 May 26, 2016

(51) Int. Cl.
*G06F 16/22* (2019.01)
*G06F 16/245* (2019.01)

(52) U.S. Cl.
CPC ............ *G06F 16/22* (2019.01); *G06F 16/245* (2019.01)

(58) Field of Classification Search
CPC .................... G06F 17/30424; G06F 17/30312
See application file for complete search history.

(56) References Cited

U.S. PATENT DOCUMENTS

| | | | |
|---|---|---|---|
| 6,957,225 B1* | 10/2005 | Zait | G06F 17/3033 |
| 8,126,870 B2 | 2/2012 | Chowdhuri et al. | |
| 8,442,999 B2 | 5/2013 | Gorelik et al. | |
| 8,538,954 B2 | 9/2013 | George et al. | |
| 8,805,784 B2 | 8/2014 | Novik et al. | |
| 2006/0242122 A1* | 10/2006 | DeVorchik | G06F 16/148 |
| 2009/0024572 A1* | 1/2009 | Mehta | G06F 17/30463 |
| 2009/0182732 A1* | 7/2009 | Dian | G06F 17/30654 |
| 2010/0037127 A1* | 2/2010 | Tomasic | G06Q 10/06 715/224 |
| 2012/0109926 A1* | 5/2012 | Novik | G06F 17/30566 707/707 |
| 2012/0158699 A1 | 6/2012 | Creel | |
| 2012/0271845 A1* | 10/2012 | Netz | G06F 17/30412 707/769 |
| 2012/0330954 A1* | 12/2012 | Sivasubramanian | G06F 9/5061 707/737 |
| 2012/0331010 A1* | 12/2012 | Christie | G06F 17/30283 707/802 |
| 2014/0025704 A1 | 1/2014 | Jin et al. | |

OTHER PUBLICATIONS

Shaun Xu, "SQL Azure Federation Introduction," http://geekswithblogs.net/shaunxu/archive/2012/01/07/sql-azure-federation-ndash-introduction.aspx, Oct. 2, 2014, pp. 5.

(Continued)

*Primary Examiner* — Apu M Mofiz
*Assistant Examiner* — Husam Turki Samara
(74) *Attorney, Agent, or Firm* — Haynes and Boone, LLP (57) ABSTRACT

Methods, systems, and computer program products for processing a query to determine query results. The query may be analyzed to determine a constant column pair corresponding to the query. The column constant pair may be analyzed with respect to a column constant pair associated with a partitioned data set in order to route the query to a subset of the data set. Data sets may be partitioned into subsets by analyzing historical queries to determine a partitioning column constant pair with respect to the data set that is used to partition the data of the data set into subsets. The query processing may include both query routing and data set partitioning.

17 Claims, 5 Drawing Sheets

(56) References Cited

OTHER PUBLICATIONS

Junjun Zhang et al., "BioMart: a Data Federation Framework for Large Collaborative Projects," Ontario Institute for Cancer Research, Toronto, Informatics and Biocomputing, Ontario M5G 0A3, Canada and 2Computer Laboratory, University of Cambridge, Cambridge CB3 0FD, UK, http://database.oxfordjournals.org/content/2011/bar038.full, Jul. 27, 2011, pp. 14.

Limor Fledel-Vagman, "OBIEE Data Federation," Oracle Israel, https://www.google.co.in/url?sa=t&rct=j&q=&esrc=s&source=web&cd=1&cad=rja&uact=8&ved=0CBwQFjAA&url=http%3A%2F%2Ftech.theoracles.co.il%2Fwp-content%2Fuploads%2F2012%2F03%2Fobiee-data-federation1.pptx&ei=eY8qVJa6l8a9uAS_xlDoDQ&usg=AFQjCNHyx-ZEFfil86oGsxHFpxEqrzrcPQ&bvm=bv.76477589,d.c2E, pp. 69.

Bartosz Dobrzelecki et al., "Integrating Distributed Data Sources with OGSA DAI DQP and Views," EPCC, University of Edinburgh, James Clerk Maxwell Building, Mayfield Road, Edinburgh EH9 3JZ, UK; National e-Science Centre, University of Edinburgh, Edinburgh EH8 9AA, UK, Aug. 2, 2010, pp. 4133-4145.

\* cited by examiner

MULTISOURCE SEMANTIC PARTITIONING

BACKGROUND

The present invention relates to database and database management systems, and more particularly to data federation.

A data federation system is a type of database management system (DBMS). In a data federation system, a federation engine may be coupled to a plurality of external data sources from which the federation engine may access data. A query for data stored in the plurality of external data sources may be received by the federation engine from a first client of a plurality of clients and distributed to the plurality of data sources.

A data federation system may be optimized by caching result sets on the federated engine, such that the federated engine may reduce the sending of sub-queries to the plurality of external data sources. The federation engine may also create one or more re-usable "virtual" views on the federation engine that store one or more result sets that the client may query.

The federation engine typically requires high query throughput because the federation engine is the access point for the plurality of clients to send a large number of queries to the plurality of external data sources. Accordingly, a limiting factor for query processing is the query throughput of the federation engine.

BRIEF SUMMARY

According to one embodiment a computer-implemented method for federated query processing comprises: receiving one or more source queries associated with a data set; storing the one or more source queries as one or more historical queries; determining one or more column constant pairs associated with the one or more historical queries; based on the one or more column constant pairs, determining a partitioning column constant pair; determining a first subset of the one or more column constant pairs that has a first pre-defined relation to the partitioning column constant pair; determining a second subset of the one or more column constant pairs that has a second pre-defined relation to the partitioning column constant pair; based on the partitioning column constant pair, partitioning the data set into a first subset of the data set and a second subset of the data set; receiving a source query; determining a source column constant pair associated with the source query; comparing the source column constant pair to the partitioning column constant pair; and based on the comparing, determining a result of the source query from at least one of the following: a view, the first subset of the data set, and the second subset of the data set.

According to another embodiment a non-transitory computer-readable medium for query processing comprises computer-readable instructions, the computer-readable instructions executable by a processor to cause the processor to: receive a source query; determine a source column constant pair associated with the source query; determine a partitioning column constant pair associated with a data set; compare the source column constant pair to the partitioning column constant pair; and based on the comparison, determine a result of the source query from at least one of the following: a view, a first subset of the data set, and a second subset of the data set.

According to yet another one embodiment a federated system for query processing, comprises: at least one processor in communication with a memory; a source router communicatively coupled to one or more data sources; the source router executable by the at least one processor to: receive a source query; determine a source column constant pair associated with the source query; compare the source column constant pair to a partitioning column constant pair that is associated with a data set; and based on the comparison, determine a result of the source query from at least one of the following: a view, a first subset of the data set that is stored on a first data source of the one or more data sources, and a second subset of the data set that is stored on a second data source of the one or more data sources.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
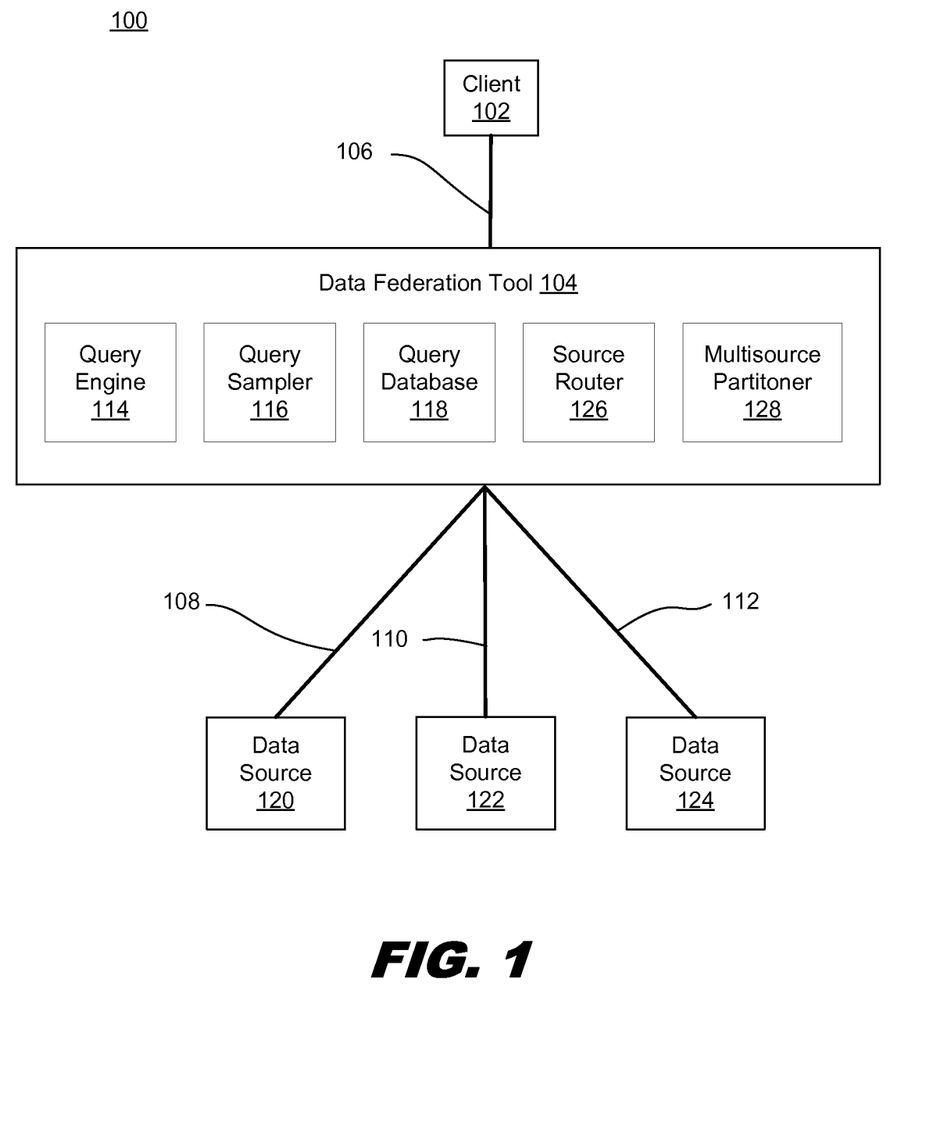
FIG. 1 is a block diagram illustrating a federated system architecture, in accordance with various examples of the present disclosure.

FIG. 1 illustrates an exemplary federated system architecture 100 in which examples of the present disclosure can be implemented. In federated system architecture 100, client 102, data sources 120, 122 and 124, and data federation tool 104 are communicatively coupled via connections 106, 108, 110 and 112 that represent any combination or physical and/or wireless connections. Each connection may be part of a network. A network may be a public network (e.g., the Internet), a private network (e.g., a local area network (LAN) or wide area network (WAN)), or a combination thereof. In an example, the network may include the Internet and/or one or more intranets, landline networks, wireless networks, and/or other appropriate types of communication networks. In an example, the network may comprise a wireless telecommunications network (e.g., cellular phone network) adapted to communicate with other communication networks, such as the Internet.

Client 102 may be a user machine, such as a personal computer (PC), a tablet PC, a set-top box (STB), a Personal Digital Assistant (PDA), a cellular telephone, a web appliance, an enterprise server, a network router, switch or bridge, or any machine capable of executing a set of instructions (sequential or otherwise). Further, while one client is illustrated, the term client shall also be taken to include any collection of computing devices that individually or jointly execute a set (or multiple sets) of instructions to perform any one or more of the methodologies discussed herein.

Client 102 may run an operating system (OS) that manages hardware and software of the respective user machine. The operating system may be any standard or proprietary OS. A browser may run on the OS of a client. The browser may be a web browser that can access content and services provided by data federation tool 104. Further, other types of software applications (e.g., applications, mobile applications, "apps") running on client 102 may provide access to content and services of data federation tool 104 without the use of a browser and/or without active human interaction.

In the present example, data sources 120, 122 and 124 may each be one or more computing devices, such as personal computers (PCs), web appliances, enterprise servers, or any machines capable of executing a set of instructions (sequential or otherwise). Data sources 120, 122 and 124 may each be configured with access to one or more standard or proprietary data stores. For example, a data store may be a flat file, a web service, or a relational database, such as an SQL-compliant database. Data stores may be homogenous or heterogeneous (e.g., data source 120 may be associated with an SQL-compliant database data store, data source 122 may be associated with a web service data store and data source 124 may be associated with a flat file data store).

Each data source may be structured with one or more applications that receive queries from data federation tool 104, process the queries to retrieve results from the appropriate one or more data stores and return the results of the queries to data federation tool 104. In the present example, the applications on a data source may comprise a relational database management system. In one example, an interface such as a Java Database Connectivity (JDBC) API may be implemented on a data source using a JDBC driver, in order for the data source to retrieve data from the data store associated with the data source by processing queries from data federation tool 104 that conform to the specifications of the JDBC interface.

In the present example, data federation tool 104 is structured as a federated database management system for processing queries. Data federation tool 104 may be software stored in one or more computer readable storage media and executed by one or more server machines that individually or jointly execute a set (or multiple sets) of instructions to perform any one or more of the methodologies discussed herein. Examples of server machines include enterprise servers, personal computers (PCs), and any machines capable of executing a set of instructions (sequential or otherwise).

Data federation tool 104 is structured to receive a federated query from a client (e.g., client 102), parse the federated query into sub-queries (e.g., a first sub-query for a first data source 120, a second sub-query for a second data source 122 and a third sub-query for a third data source 124), retrieve results for the sub-queries from the data sources, aggregate the sub-query results and present the aggregated sub-query results to the client.

Re-usable "virtual" views may be created by data federation tool 104 in order to store aggregated results of the sub-queries locally by data federation tool 104 such that future queries of the data in the view may be processed by data federation tool 104 accessing the view directly rather than by sending sub-queries to data sources and aggregating the sub-query responses.

In the present example, data federation tool 104 includes query engine 114, query sampler 116, query database 118, source router 126 and multisource partitioner 128.

In the present example, query engine 114, query sampler 116, source router 126 and multisource partitioner 128 may be implemented as software modules that are stored on a machine (e.g., the data federation tool 104 server machine) and executed via one or more processors. Query database 118 may be a database such as an SQL-compliant database. In another example, query database 118 may be another type of data store, such as a flat file or a web service. Query database 118 may be stored on a server machine that is local or external to the data federation tool 104.

Query engine 114 is structured to receive and process queries from client 102, such as federated queries. These federated queries may be processed by generating sub-queries of the federated queries, which are referred to as source queries. Query sampler 116 is communicatively coupled to query engine 114, in order to receive source queries from query engine 114. Query sampler 116 is communicatively coupled to query database 118 and source router 126. Query sampler 116 is structured to store the source queries into query database 118.

Source router 126 is communicatively coupled to data sources 120, 122 and 124, such that source router 126 is structured to receive source queries from query sampler 116 and send the source queries to a view or to the one or more data sources for processing. The view may be configured, for example by a data architect, to store result data sets from the data sources locally on data federation tool 104.

Multisource partitioner 128 is communicatively coupled to query database 118 and data sources 120, 122 and 124. Multisource partitioner 128 is structured to perform analysis of historical queries stored in query database 118, in order to partition data on data sources 120, 122 and 124 into various data set configurations to optimize the data sets such that query responses may be determined more efficiently.

Query engine 114, query sampler 116, query database 118, source router 126 and multisource partitioner 128 allow data federation tool 104 to process queries more efficiently, which improves the functionality of the client machine(s), server machine(s) and data source machine(s) in federated system 100. For example, queries may be processed faster, thereby increasing query throughput.

Figure 2:
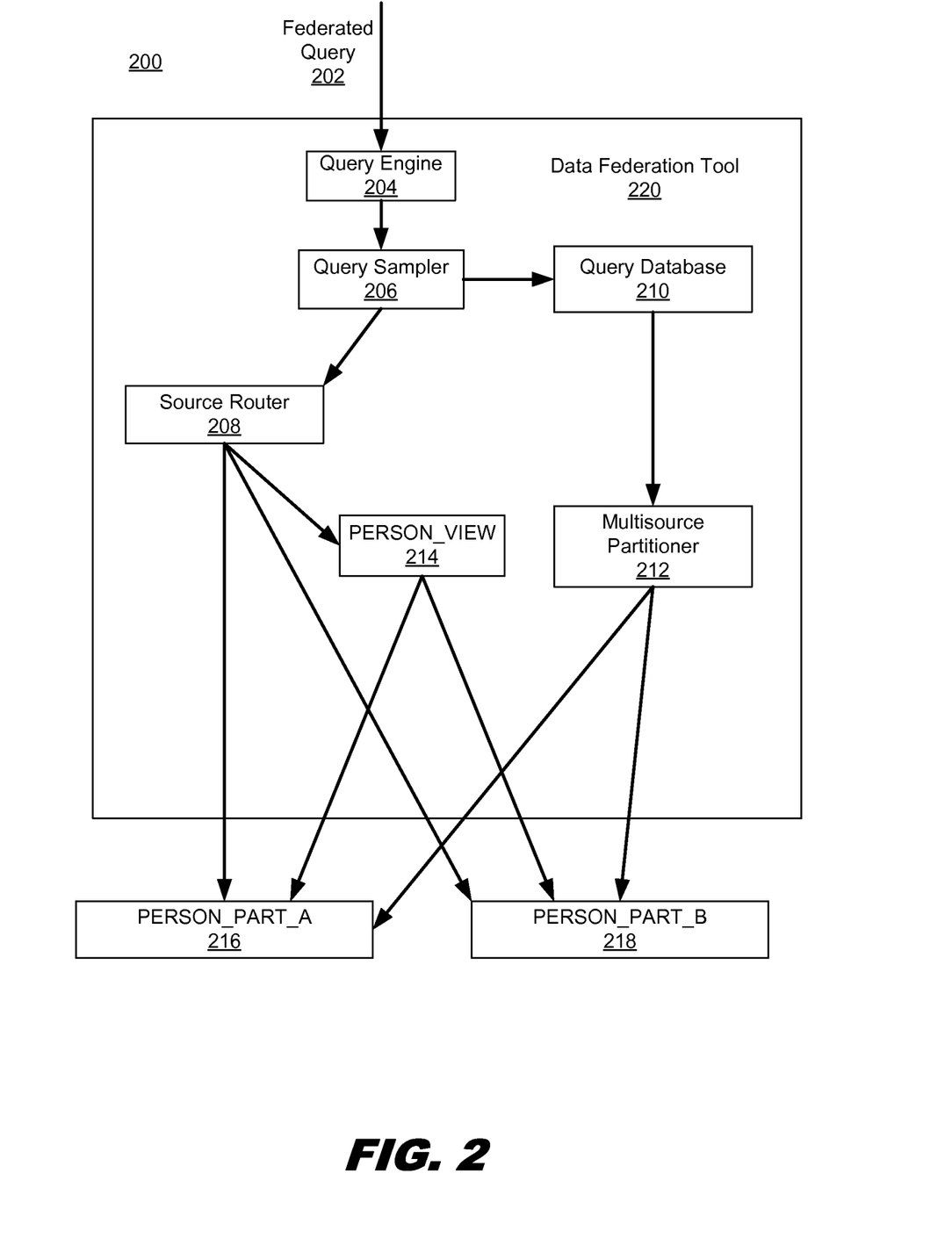
FIG. 2 is a block diagram illustrating query processing, according to an example of the present disclosure.

FIG. 2 is a block diagram illustrating query processing, according to an example of the present disclosure. The architecture 200 may comprise hardware (e.g., circuitry, dedicated logic, programmable logic and microcode), software (such as instructions run on a computer system, specialized hardware, dedicated machine, or processing device), firmware, or a combination thereof that performs one or more methods for query processing.

A federated query 202 may originate from a client and be sent the data federation tool 220. The query may be referred to as "federated" because the query may contain component parts that may be parsed into one or more sub-queries.

Federated query 202 may request data from one or more data sets that are accessible to data federation tool 220. The data sets may be stored locally to data federation tool 220 or stored externally on one or more data sources.

At 204, the federated query 202 is received from the client by query engine 204 at data federation tool 220. Query engine 204 may parse the federated query to generate sub-queries that are referred to as source queries. In another example, the parsing and generating of sub-queries may be performed by decomposing the federated query into component sub-parts, based on how data is allocated by data sources. For example, if the federated query requests data from a data table stored on a first data source and data from a data table stored on a second data source, the federated query may be decomposed into a first source query that requests data from the data table of the first data source and a second source query that requests data from the data table of the second data source.

The source queries may be components of the federated query such that the query responses to the source queries may be aggregated to determine a result set corresponding to the federated query. Once the source queries are generated, the source queries are sent from query engine 204 and received by query sampler 206. In another example, the source queries may be sent by query engine 204 to source router 208, with query sampler 206 intercepting the source queries. Intercepting may be performed by query sampler 206 monitoring query engine 204 to determine source queries.

Query sampler 206 may process source queries by sending the source queries to query database 210 for storage as historical queries. Query sampler 206 may determine additional statistics relating to historical queries. The statistics may comprise size information relating to each historical query, such as the response size for each historical query, the processing time of each historical query, and so forth. Response size may be measured using a variety of metrics, including size as measured by bytes (and other unit variations such as kilobytes and megabytes), number of elements retrieved, number of columns, number of rows, and so forth.

In another example, query sampler 206 may store only a subset of the source queries as historical queries. For example, a subset of source queries may be source queries from a pre-determined time period such as source queries within the past six months. In another example, the subset of the source queries may be source queries that occur within a particular time window, such as source queries within 5 ms of one another.

The statistics for each historical query may be stored in query database 210 in association with each corresponding historical query. For example, once a query response is received from a data source corresponding to a first source query, the size of the response to the first source query may be measured and the size stored in association with the historical query corresponding to the first source query in query database 210.

Source router 208 may receive each source query from query engine 204 or query sampler 206, depending upon whether query engine 204 is structured to send the source query to source query 208 or to query sampler 206. As previously discussed, query engine 204 may be structured to send the source query with source router 208 with query sampler 206 intercepting the source query.

In the present example, source router 208 may process the source query after the source query is sent to query database 210 for storage. In another example, the source query may be sent to source router 210 in parallel or prior to the source query being stored in query database 210 as a historical query.

Source router 208 processes the source query using routing logic to route the query to a view or a data source. In the present example, the source query pertains to data stored in a PERSON data table. In the present example, the data from the PERSON data table is partitioned into two subset data tables, PERSON_PART_A 216 and PERSON_PART_B 218, each of which is stored a data table separate from the PERSON data table on a different data source from one another.

In the present example, a federated view PERSON_VIEW 214 contains the data of the PERSON data table and is stored on data federation tool 220. PERSON_VIEW 214 may be an optimization of data federation tool 220 that allows data federation tool 220 to access data from the view locally and return source query responses to clients without having to send source queries to external data sources.

In the present example, the source query is a request for data from the PERSON data table. Accordingly, source router 208 optimizes the source query by selecting between the PERSON data table, PERSON_VIEW 214, PERSON_PART_A 216 and PERSON_PART_B 218.

Figure 4:
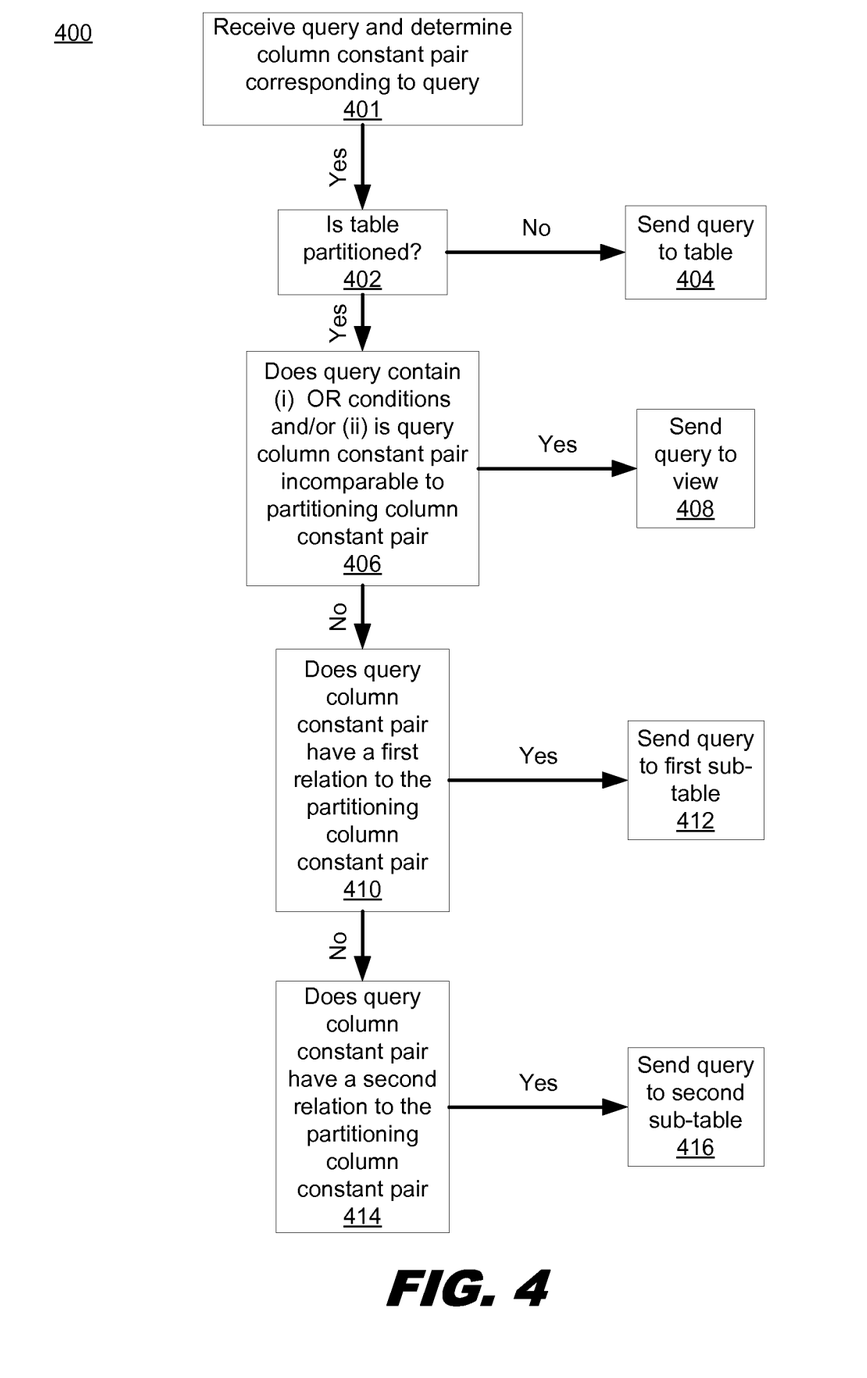
FIG. 4 is a flow diagram illustrating query routing, in accordance with various examples of the present disclosure.

The analysis for selecting the optimal data store for which to route the source query is discussed further regarding FIG. 4.

If source router 208 determines that the source query is to be routed to PERSON_VIEW 214, then the source query is processed by data federation tool 220 retrieving data results from PERSON_VIEW at 214. Any statistics relating to the source query, such as the size of the source query response that includes the data results may be stored in query database 210 with the historical query corresponding to the source query. The source query data results that are retrieved from PERSON_VIEW 214 may be aggregated with any other source query data results pertaining to the received federated query. The aggregated source query data results may be returned to the client by data federation tool 220 as a response to federated query 202.

If source router 208 determines that the source query is to be routed to PERSON_PART_A 216, then the source query is processed by sending the source query to a first data source that is associated with PERSON_PART_A 216. The first data source receives the source query and processes the source query to retrieve the source query results from PERSON_PART_A 216. In the present example, PERSON_PART_A 216 may be a data table that is stored on the first data source, wherein the table stores a first subset of the data from the PERSON data table. Any statistics relating to the source query, such as the size of the source query response that includes the data results may be stored in query database 210 with the historical query corresponding to the source query. The size of the source query response may be measured by the first data source or by data federation tool 220. The source query data results that are retrieved from PERSON_PART_A 216 may be sent to the data federation tool 220 for aggregation by data federation tool 220 with any other source query data results pertaining to the received federated query. The aggregated source query data results may be returned to the client by data federation tool 220 as a response to federated query 202.

If source router 208 determines that the source query is to be routed to PERSON_PART_B 218, then the source query is processed by sending the source query to a second data source that is associated with PERSON_PART_B 218. The second data source receives the source query and processes the source query to retrieve the source query results from PERSON_PART_B 218. In the present example, PERSON_PART_B 218 may be a data table that is stored on the second data source, wherein the table stores a second subset of the data from the PERSON data table. Any statistics relating to the source query, such as the size of the source query response that includes the data results may be stored in query database 210 with the historical query corresponding to the source query. The size of the source query response may be measured by the second data source or by data federation tool 220. The source query data results that are retrieved from PERSON_PART_B 218 may be sent to the data federation tool 220 for aggregation by data federation tool 220 with any other source query data results pertaining to the received federated query. The aggregated source query data results may be returned to the client by data federation tool 220 as a response to federated query 202.

Multisource partitioner 212 is executed periodically to analyze the historical queries stored in query database 210, in order to determine optimal allocation of data in one or more views and data sources. Multisource partitioner 212 may operate in parallel to the query processing operations performed by the other components such as query engine 204, query sampler 206 and source router 208. In another example, multisource partitioner 212 may be scheduled to run at other times, such as non-peak times. The periodic execution of multisource partitioner 212 may be pre-defined based on a user configured time-increment or schedule. In another example, data federation tool 220 may schedule execution of multisource partitioner 212 on the basis of activity determined by data federation tool 220.

Figure 3:
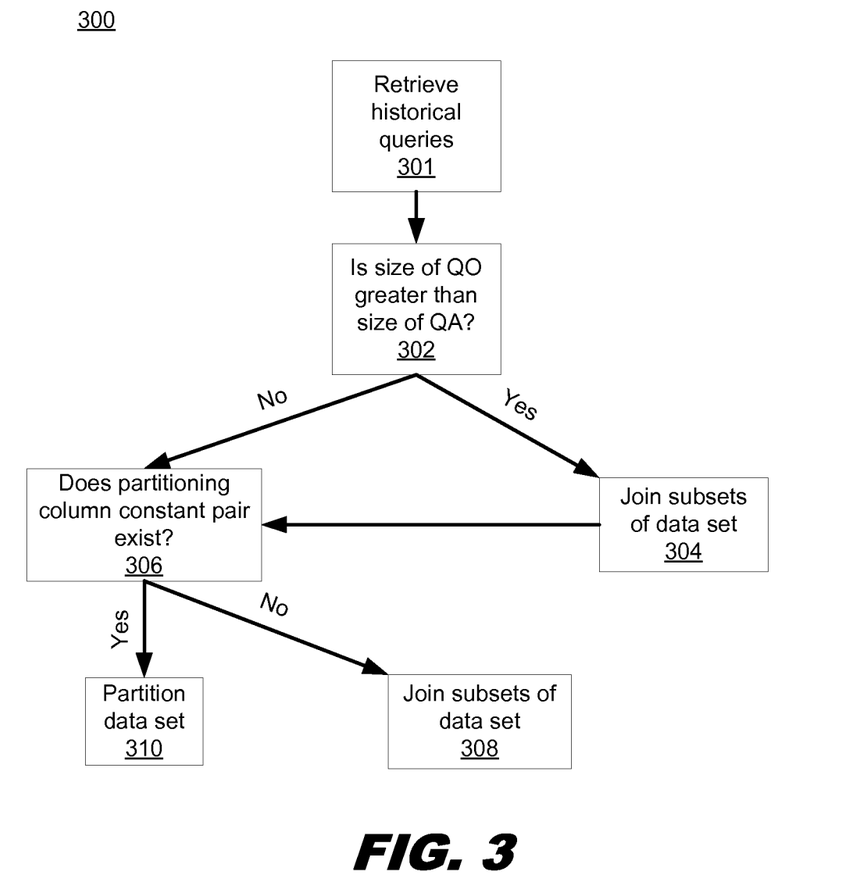
FIG. 3 is a flow diagram illustrating data partitioning, according to an example of the present disclosure.

The analysis for determining the optimal allocation of data by multisource partitioner 212 is discussed further regarding FIG. 3.

In the present example, based on the analysis, multisource partitioner 212 may partition PERSON_PART_A 216 and PERSON_PART_B 218 by joining the data subsets and/or by splitting the data into different data subsets. For example, data subsets that were previously partitioned may be joined into a single data set, and the data set analyzed to determine a new optimal partitioning of the data set into a first subset of the data set and a second subset of the data set that are different from the previously determined subsets of the data set.

An example of joining is combining PERSON_PART_A 216 and PERSON_PART_B 218 into a single data set (e.g., PERSON) that contains the data from both PERSON_PART_A 216 and PERSON_PART_B 218. An example of splitting is determining two subsets of the data set stored in the PERSON data table, and storing each subset in a separate data table (e.g., PERSON_PART_A 216 and PERSON_PART_B 218). Further, each subset of the data set may be further split, such as splitting PERSON_PART_B 218 into two subsets (e.g., PERSON_PART_C and PERSON_PART_D).

FIG. 3 is a flow diagram illustrating data partitioning, according to an example of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

In the present example, data partitioning is performed by a multisource partitioner. Multisource partitioner may perform data partitioning on a table by table basis, starting with a first table and moving to a next table once the first table is finished partitioning. In another example, tables may be partitioned concurrently.

At block 301, the multisource partitioner retrieves one or more historical queries from a query database. Multisource partitioner analyzes the historical queries and their associated historical query statistics that are stored in a query database pertaining to a particular table. Historical query statistics may include statistics pertaining to historical queries, such as the sizes of the historical queries. A size of a historical query may be, for example, the size of the query response for the historical query. In the present example, query response size may correspond to size as measured in any of bytes, kilobytes and megabytes. In another example, size may be a measurement of the total number of results in the query response. Various other size metrics may be used in addition to the examples given. The size of the query response for the historical query may be measured by the data source that determined the query response. In another example, the size of the query response for the historical query may be measured by the data federation tool upon receiving the query response from the data source. In another example, the size of the query response for the historical query may be measured by the data federation tool upon determining the query response from a federated view.

At block 302, the multisource partitioner determines (i) historical queries that have an OR condition pertaining to two data stores, which will be referred to as QO and (ii) historical queries that have an AND condition, will be referred to as QA.

The sizes of the QO historical queries may be aggregated and compared to the aggregated size of the QA historical queries.

At block 304, if the size of QO is greater than the size of QA, then the data from the two data stores may be joined into a single data store. For example, if there is a PEOPLE data table that was previously partitioned into PEOPLE_A and PEOPLE_B subset data tables, the partitions may be joined into a single PEOPLE data table. In another example, the data from the subset data stores may be joined if the size of QO is greater than or equal to the size of QA.

At block 306 the historical queries are analyzed to determine whether a partitioning column constant pair, (C, K), exists for partitioning the data in each data store to optimize query processing. In the present example, the partitioning column constant pair represents a column and constant that are used to partition data into subsets.

The determining of a partitioning column constant pair for the historical queries pertaining to a data store is performed by analysis of the one or more column constant pairs of the historical queries. In the present example, the column constant pairs for each historical query are retrieved from the query database. The column constant pairs for each historical query may be determined and stored in the query database as the source queries corresponding to the historical queries are processed. In another example, column constant pairs may be determined for the historical queries before, during or after historical queries are retrieved from the query database.

Column constant pairs for a historical query may be determined as illustrated in the following SQL example.

An SQL formatted historical query may be: "SELECT name FROM people WHERE age <30 and gender='male.'" Accordingly, the two following column constant pairs may be determined for the historical query with respect to the "people" data store based on the WHERE clause: (age, 30) and (gender, male). Each column constant pair may be a tuple, as shown. In another example, the column and constant may be represented by another data structure, such as a linked list, and/or stored in an alternate format.

The column constant pairs of the historical queries for data in the data set stored by the data store are analyzed, such as by a brute force algorithm, to determine a partitioning column constant pair comprising a column C and a constant K, such that (i) historical queries with column constant pairs that have a first pre-defined "less than or equal to" relation to the partitioning column constant pair will return approximately a first pre-defined amount of the size of historical queries with a second pre-defined "greater than" relation to the partitioning column constant pair and (ii) the size of historical queries incomparable to the partitioning column constant pair is a second pre-defined amount of the size of the total size of the data returned by all historical queries with respect to the data store. In another example, the determining of the partitioning column constant pair may use an algorithm other than a brute-force algorithm that evaluates every historical query with respect to the data store. Examples of other algorithms that may be used include recursive "divide and conquer" algorithms and sorting algorithms such as merge sort, heapsort, quicksort, bubble sort and distribution sort.

In another example, instead of "less than or equal to" and "greater than," the relation between the column constant pairs of the historical queries and the determined partitioning column constant pair may instead be "less than" and "greater than or equal to."

In the present example, the first pre-defined amount may be a size difference between +10% or −10%. For example, the historical queries with column constant pairs less than or equal to the partitioning column constant pair may be within 10% of the size of historical queries with column constant pairs that are greater than the partitioning column constant pair. In another example, a different pre-defined amount may be configured. Setting the first-predefined amount to a difference of +10% or −10% may help ensure an approximately even split of the data in a data set of a data store into two subsets of the data set.

In the present example, the second pre-defined amount may be a size difference of 10% or less of the total size of the historical queries with respect to the data store. Accordingly, the data in a data set may be split such that the size of the historical queries have column constant pairs that are incomparable to the partitioning column constant pair is relatively small compared to the total size of the historical queries with respect to the data store.

Column constant pairs (age, 20) and (age, 30) are examples of column constant pairs that are less than or equal to a partitioning column constant pair (age, 30).

A column constant pair (age, 31) is an example of a column constant pair that is greater than a partitioning column constant pair (age, 30).

Accordingly, in the present example, if the partitioning column constant pair is determined to be (age, 30), the data of a data set in a data store may be split such that data values of 30 or less in the age column are placed in a first data table as a first subset of the data set, and data values above 30 in the age column are placed in a second data table as a second subset of the data set.

For strings, less than or equal may relations include any strings that are the same, because of the or equal clause. Strings that are not equal may be considered as "greater" by default as the strings are not included in the less than or equal to relation. For example, a column constant pair (gender, male) is less than or equal to the column constant pair (gender, male). The column constant pair (gender, female) is greater than (gender, male) by default, since (gender, female) is not "less than or equal to" (gender, male).

Similarly, for strings there are various relations that may be used rather than "less than or equal to" and "greater than." For example, the relation may be "equal to" or "not equal to" or "less than" and "greater than or equal to." In another example, strings may be converted to numbers such that a less than or greater than relationship may be determined for the strings.

Column constant pairs may be determined to be incomparable to a partitioning column constant pair as well. A column constant pair (gender, % ale) is an example of a column constant pair that is incomparable to either (gender, male) or (gender, female). In SQL, % represents a wild card character. Therefore, % ale may refer to either male or female. As such, % ale may be determined to be incomparable to "male" and "female" as % ale refers to both "male" and "female."

At block 308, if no partitioning column constant pair is determined to exist that meets the pre-defined relation for a data table that was previously split into two subset data tables, then the data from the subset data tables are joined into a single data table. If the subset tables for the data table are already joined then the method ends.

At block 310, if a partitioning column constant pair is determined to exist that meets the pre-defined relation, in this example the size of the historical queries that are "less than or equal to" the partitioning column constant pair is within 10% of the size of the historical queries that are "greater than" the partitioning column constant pair, then the table is partitioned using the partitioning column constant pair, with data having values in the column C that are less than or equal to K being placed into a first subset data table, and data having values in the column C greater than K being placed into a second subset table. Accordingly, the data of the data table is split into a first subset of the data set that is placed into a first sub-table and a second subset of the data set that is placed into a second sub-table.

The partitioning may be performed on sub-tables as well, for example using recursion, in order to further partition data from the sub-tables into sub-tables of the sub-tables. Tables and sub-tables may be moved between data sources as well, to optimize query processing. For example, a first data source may be determined to have a heavy query load compared to a second data source. A subset of the data from the first data source may be placed into a sub-table that is moved to the second data source, in order to load-balance the query processing among the data sources.

Once the partitioning column constant pair is determined for partitioning of the table and/or sub-tables, the partitioning column constant pair may be associated with the tables and sub-tables such that one or more future queries are routed to the tables based on the column constant pairs associated with the future queries. For example, a data table that is partitioned may be associated with the partitioning column constant pair, the first subset data table may be associated with the data that is less than or equal to the partitioning column constant pair, and the second subset data table may be associated with the data that is greater than the partitioning column constant pair. The associations between the data tables and the partitioning column constant pair may be stored in a data store, such as a relational database. In another example, the partitioning column constant pair may be associated with a table or sub-table by storing the partitioning column constant pair in the metadata of the table or sub-table.

Query routing based on the partitioning column constant pair is discussed further regarding FIG. 4.

The goal of the data partitioning may be to group the data into evenly distributed subsets based on the typical usage of the data federation tool as determined by analyzing the historical queries. Such evenly distributed groupings may provide for faster data retrieval as there is less data in each table to search through in order to determine results to a query.

In another example, the goal may be to determine the data that is most frequently accessed, such that the frequently accessed data is located in a different table than the data that is infrequently accessed.

The pre-defined relations may be configured, such as by a data architect user, in order to meet various goals for partitioning data.

FIG. 4 is a flow diagram illustrating query routing, according to an example of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 401, the source router receives a query, such as a source query and analyzes source queries to determine where to route the source query. The analysis includes determining a source column constant pair that corresponds to the source query. The source column constant pair may be determined in a similar way as the determining of historical query column constant pairs as described in block 306 of regarding FIG. 3.

At block 402, the source router determines the data table that stores the data corresponding to the data requested by the source query. If the table is not partitioned, then at 404 the source query may be sent to the data source that contains the table. The data source that contains the table may receive the source query, process the source query using the data table to determine a source query response that contains the source query results, and send the source query response to the data federation tool.

If the table is partitioned, such that data from the table is split into two or more data subsets that are stored in sub-tables, then a determination is made at step 406 whether the source query contains any OR conditions. If the source query contains OR conditions, then the source query may be retrieved at block 408 from a view by the data federation tool.

If at block 406, a determination is made that that source query is associated with a column constant pair that is incomparable to the column constant pair associated with the table that stores the requested data, then the source query is retrieved at block 408 from a view by the data federation tool.

At block 410, if the column constant pair associated with the source query is determined to have a pre-defined relation, which in this example is "less or equal to" the partitioning column constant pair associated with the table, then the source query is sent to the first sub-table of the table that stores a first subset of the data set at block 412.

At block 414, if the column constant pair associated with the source query is determined to have a pre-defined relation, which in this example is "greater than" the partitioning column constant pair associated with the table, then the source query is sent to the second sub-table of the table that stores a second subset of the data set at block 416.

In another example, instead of the "less than or equal to" and "greater than" relations, other relations may be pre-defined by a user. For example, the source queries that have a column constant pair "greater than or equal to" a partitioning column constant pair associated with a table may be routed to one sub-table and source queries that have a column constant pair that is "less than" a column constant pair associated with the table may be routed to another sub-table.

Routing the source queries based on the column constant pairs allows source query results to be determined from less subsets of data, therefore reducing the amount of data that is required to be searched. The partitioning of data results in optimized query efficiency and improved query processing functionality.

Figure 5:
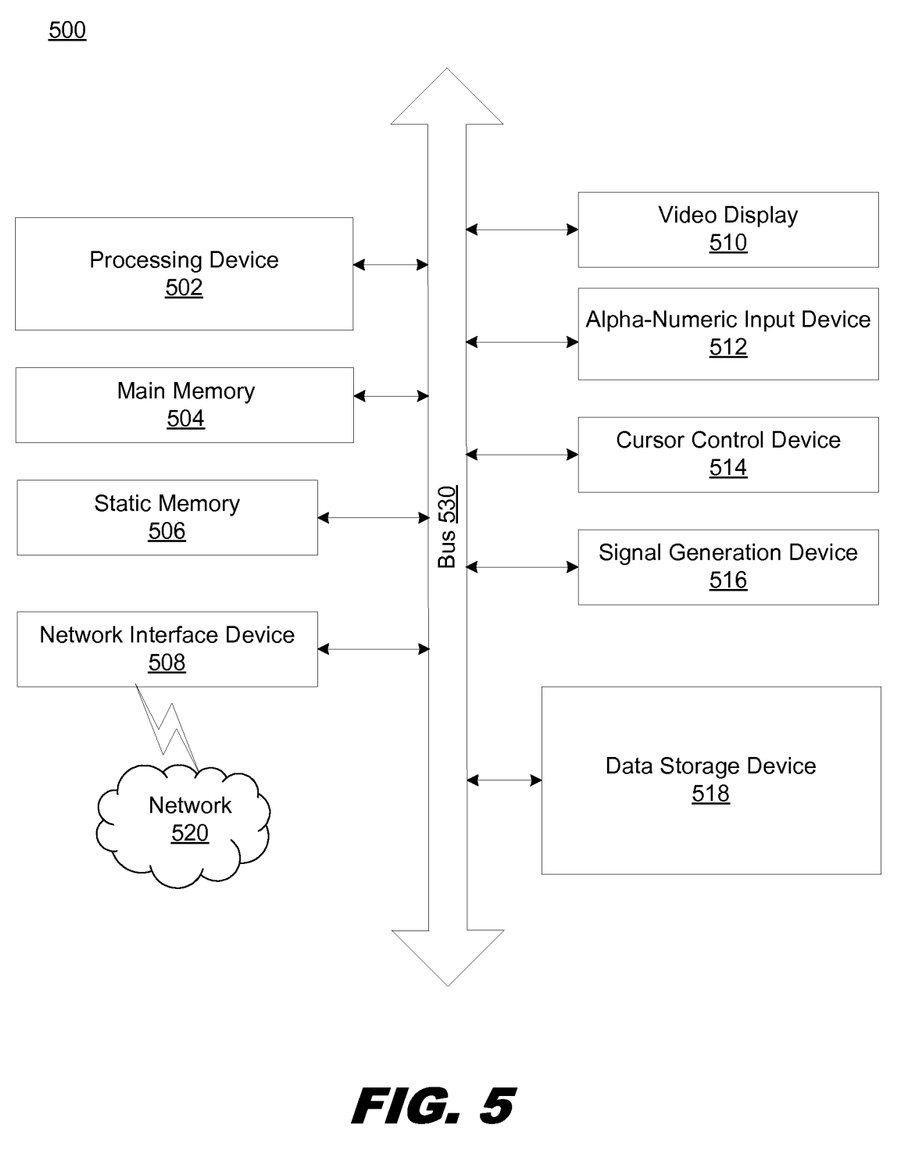
FIG. 5 is a block diagram illustrating an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Exemplary computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method for federated query processing comprising:
   receiving one or more source queries associated with a data set;
   storing the one or more source queries as one or more historical queries;
   storing at least one statistic for each of the one or more historical queries, the at least one statistic including a size for each of the one or more historical queries;
   determining one or more column constant pairs associated with the one or more historical queries, each column constant pair identifying a column and a corresponding value;
   based on the one or more column constant pairs, determining a partitioning column constant pair,
      wherein the one or more column constant pairs corresponding to a first subset of the one or more historical queries have a first pre-defined relation to the partitioning column constant pair, the first pre-defined relation having a size difference between +10% or −10%,
      wherein the one or more column constant pairs corresponding to a second subset of the one or more historical queries have a second pre-defined relation to the partitioning column constant pair, the second pre-defined relation having a size difference of less than 10%, and
      wherein the first subset of the one or more historical queries is within a pre-determined size corresponding to the second subset of the one or more historical queries;
   based on the determined partitioning column constant pair, partitioning the data set into a first subset of the data set and a second subset of the data set;
   storing, in a data store, associations between the determined partitioning column constant pair and both of the first subset of the data set and the second subset of the data set;
   after the partitioning, determining a source column constant pair associated with a received source query;
   comparing the source column constant pair to the partitioning column constant pair;
   based on the comparing, generating a result corresponding to the received source query from at least one of the following: a view, the first subset of the data set, and the second subset of the data set; and
   joining the first subset of the data set and the second subset of the data set when the one or more historical queries including an "or" operator are determined to have a greater size than the one or more historical queries including an "and" operator.

2. The method of claim 1 wherein (i) the first pre-defined relation is a "less than or equal to" relation and the second pre-defined relation is a "greater than" relation or (ii) the first pre-defined relation is a "less than" relation and the second pre-defined relation is a "greater than or equal to" relation.

3. The method of claim 1, further comprising at least one of:
routing the received source query to the view if the source column constant pair is determined to be incomparable to the partitioning column constant pair;
routing the received source query to the first subset of the data set if the source column constant pair is determined to have the first pre-defined relation to the partitioning column constant pair; or
routing the received source query to the second subset of the data set if the source column constant pair is determined to have the second pre-defined relation to the partitioning column constant pair.

4. The method of claim 1, wherein the first subset of the data set is located on a first data source and the second subset of the data set is located on a second data source that is different than the first data source.

5. The method of claim 1, wherein the partitioning column constant pair includes a tuple comprising at least one column identifier and at least one constant corresponding to the at least one column identifier.

6. The method of claim 1 further comprising:
determining a third subset of the one or more column constant pain, wherein the third subset is determined to be incomparable to the partitioning column constant pair.

7. The method of claim 1, wherein the first subset of the data set has the first pre-defined relation with respect to the partitioning column constant pair, and wherein the second subset of the data set has the second pre-defined relation with respect to the partitioning column constant pair.

8. A non-transitory computer-readable medium for query processing comprising computer-readable instructions, the computer-readable instructions executable by one or more processors to perform operations comprising:
receiving one or more source queries associated with the data set;
storing the one or more source queries as the one or more historical queries;
storing at least one statistic for each of the one or more historical queries, the at least one statistic including a size for each of the one or more historical queries;
determining a partitioning column constant pair associated with a data set, the partitioning column constant pair identifying a column and a corresponding value, the determining including
identifying a first set of one or more column constant pairs having a first pre-defined relation to the partitioning column constant pair, wherein the first set corresponds to a first subset of one or more historical queries, the first pre-defined relation having a size difference between +10% or −10%;
identifying a second set of one or more column constant pairs having a second pre-defined relation to the partitioning column constant pair, wherein the second set corresponds to a second subset of the one or more historical queries, the second pre-defined relation having a size difference of less than 10%, and wherein the first subset of the one or more historical queries is within a pre-determined size of the second subset of the one or more historical queries;
based on the partitioning column constant pair, partitioning the data set into a first subset of the data set and a second subset of the data set;
storing, in a data store, associations between the determined partitioning column constant pair and both of the first subset of the data set and the second subset of the data set;
after determining the partitioning column constant pair, determining a source column constant pair associated with a received source query;
comparing the source column constant pair to the partitioning column constant pair;
based on the comparing, determining a result of the received source query from at least one of the following: a view, a first subset of the data set, and a second subset of the data set; and
joining the first subset of the data set and the second subset of the data set when the one or more historical queries including an "or" operator are determined to have a greater size than the one or more historical queries including an "and" operator.

9. The non-transitory computer-readable medium of claim 8, wherein the partitioning column constant pair includes a tuple comprising one or more column identifiers and one or more constants corresponding to the column identifiers.

10. The non-transitory computer-readable medium of claim 8, wherein (i) the first pre-defined relation is a "less than or equal to" relation and the second pre-defined relation is a "greater than" relation or (ii) the first pre-defined relation is a "less than" relation and the second pre-defined relation is a "greater than or equal to" relation.

11. The non-transitory computer-readable medium of claim 8, the operations further comprising at least one of:
routing the received source query to the view if the source column constant pair is determined to be incomparable to the partitioning column constant pair;
routing the received source query to the first subset of the data set if the source column constant pair is determined to have the first pre-defined relation to the partitioning column constant pair; or
routing the received source query to the second subset of the data set if the source column constant pair is determined to have the second pre-defined relation to the partitioning column constant pair.

12. The medium of claim 8, the operations further comprising:
determining a third subset of the one or more column constant pairs, wherein the third subset is incomparable to the partitioning column constant pair.

13. A federated system for query processing, comprising:
at least one processor in communication with a memory;
a multisource partitioner executable by the at least one processor to perform operations comprising:
storing at least one statistic for each of one or more historical queries, the at least one statistic including a size for each of the one or more historical queries;
determining one or more column constant pairs associated with the one or more historical queries, each column constant pair identifying a column and a corresponding value; and
based on the one or more column constant pairs, determining a partitioning column constant pair,
wherein the one or more column constant pairs corresponding to a first subset of the one or more historical queries have a first pre-defined relation to the partitioning column constant pair, the first pre-defined relation having a size difference between +10% or −10%,
wherein the one or more column constant pairs corresponding to a second subset of the one or more historical queries have a second pre-defined relation to the partitioning column constant pair, the second pre-defined relation having a size difference of less than 10%, and
wherein the first subset of the one or more historical queries is within a pre-determined size corresponding to the second subset of the one or more historical queries;
based on the partitioning column constant pair, partitioning the data set into the first subset of the data set and the second subset of the data set;
storing, in a data store, associations between the determined partitioning column constant pair and both of the first subset of the data set and the second subset of the data set; and
a source router communicatively coupled to one or more data sources, the source router executable by the at least one processor to perform operations comprising:
determining a source column constant pair associated with a received source query;
comparing the source column constant pair to the partitioning column constant pair;
based on the comparing, determining a result of the source query from at least one of the following: a view, a first subset of the data set that is stored on a first data source of the one or more data sources, and a second subset of the data set that is stored on a second data source of the one or more data sources; and
joining the first subset of the data set and the second subset of the data set when the one or more historical queries including an "or" operator are determined to have a greater size than the one or more historical queries including an "and" operator.

14. The federated system of claim 13, wherein the partitioning column constant pair includes a tuple comprising one or more column identifiers and one or more constants corresponding to the column identifiers.

15. The federated system of claim 13, wherein (i) the first pre-defined relation is a "less than or equal to" relation and the second pre-defined relation is a "greater than" relation or (ii) the first pre-defined relation is a "less than" relation and the second pre-defined relation is a "greater than or equal to" relation.

16. The federated system of claim 13, wherein the source router—further performs operations comprising at least one of:
routing the received source query to the view if the source column constant pair is determined to be incomparable to the partitioning column constant pair;
routing the received source query to the first subset of the data set if the source column constant pair is determined to have the first pre-defined relation to the partitioning column constant pair; or
routing the received source query to the second subset of the data set if the source column constant pair associated with a source query is determined to have the second pre-defined relation to the partitioning column constant pair.

17. The federated system of claim 13, the multisource partitioner further performing operations comprising:
determining a third subset of the one or more column constant pairs, wherein the third subset is determined to be incomparable to the partitioning column constant pair.

* * * * *